Jan. 12, 1960
D. L. THOMAS
PROTECTION AGAINST FAILURE OF PILOT WAVE IN CARRIER COMMUNICATION SYSTEMS
Filed Feb. 23, 1956
2,921,267
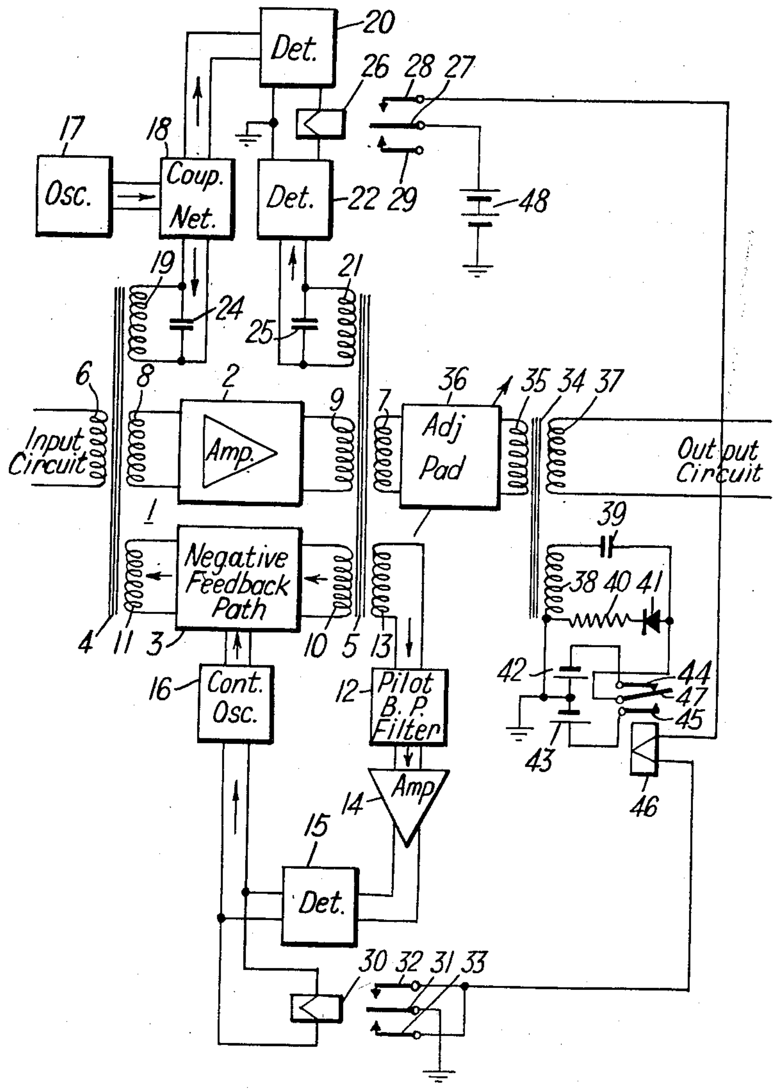
Inventor
D. L. THOMAS
By [signature]
Attorney United States Patent Office 2,921,267

Patented Jan. 12, 1960

2,921,267

PROTECTION AGAINST FAILURE OF PILOT WAVE IN CARRIER COMMUNICATION SYSTEMS

David Lane Thomas, London, England, assignor to International Standard Electric Corporation, New York, N.Y., a corporation of Delaware Application February 23, 1956, Serial No. 567,377

Claims priority, application Great Britain February 25, 1955

3 Claims. (Cl. 330—144)

The present invention relates to safe-guarding arrangements for electric carrier current communication systems employing amplifiers with automatic gain control arrangements.

In such carrier systems, it is common practice to transmit a band of frequencies corresponding to a group of channels through one or more amplifiers whose gain is controlled by a pilot current transmitted with the channel band. The arrangement aims at automatically fixing the signal level at the output of each amplifier, and accordingly the gain of the amplifier is increased when the level of the pilot current at the output of the amplifier tends to fall, and vice-versa. In case the pilot current should fail for some reason, the gain of each amplifier of the system will increase to a maximum, and this is very undesirable since it generally causes the circuit to sing. Similar results may be caused by other kinds of fault.

The object of the present invention is to prevent an undesirable reduction in the transmission equivalent of the system when faults of the kind mentioned occur.

This object is achieved according to the invention by providing a safe-guarding arrangement for an electric wave amplifier provided with pilot-operated automatic gain control arrangements, and adapted to amplify electric waves occupying a specified band of frequencies, comprising monitoring means separate from the said gain control arrangements for continuously measuring the gain of the said amplifier, and means controlled by the monitoring means for automatically inserting a given amount of attenuation in cascade with the amplifier when the measured gain exceeds a first specified value.

The invention will be described with reference to the figure of the accompanying drawing which shows a block schematic diagram of an embodiment of the invention.

The figure shows a conventional amplifier circuit 1 which comprises a forward amplifying path 2 and a variable negative feed back path 3. The amplifier is provided with an input transformer 4, and an output transformer 5. The circuit conveying the band of frequencies to be amplified is connected to the primary winding 6 of the input transformer 4, and the amplified waves are obtained from the secondary winding 7 of the output transformer 5. The amplifying path 2 is connected between a secondary winding 8 of the transformer 4 and a primary winding 9 of the transformer 5. The negative feed back path 3 is connected between a secondary winding 10 of the transformer 5 and a primary winding 11 of the transformer 4.

The automatic gain control arrangements comprise a band-pass filter 12 for selecting the pilot wave, which is connected to a secondary winding 13 of the transformer 5. The selected pilot wave is amplified by an amplifier 14 and is supplied to a detector 15, which produces an output control voltage depending upon the level of the pilot wave at the output of the amplifier 14. This control voltage is applied to control the output level of a low frequency oscillator 16 which supplies control waves to a thermistor (not shown) which forms part of the net-work in the negative feedback path 3. This gain control arrangement is conventional.

According to the invention, an arrangement entirely independent of the gain control arrangement is provided for effectively measuring the gain of the amplifier 1. An oscillator 17 supplies test waves at a convenient frequency lying outside the signal band of frequencies. The waves from the oscillator 17 are supplied through a coupling network 18 to a primary winding 19 of the transformer 4 and also to a detector 20. The network 18 may be of any convenient type, and preferably should be such that the levels of the waves supplied to the winding 19 and to the detector 20 are equal. A secondary winding 21 of the output transformer 5 is connected to another detector 22 similar to 20. The windings 19 and 21 should preferably be tuned by means of capacitors 24 and 25 to the frequency of the test waves.

The two detectors 20 and 22 are connected to the winding of a marginal relay 26 in such manner that the current flowing through the relay winding is proportional to the difference of the voltages generated by the two detectors 20 and 22, and so that the direction of the current is determined by the sign of this difference. The relay 26 should be adjusted in such manner that the moving spring 27 makes contact with an upper fixed spring 28 when the level at the output of the amplifier 1 exceeds the level at the input by some specified amount, such as six decibels. The adjustment should also be such that the moving spring 27 makes contact with a lower fixed spring 29 when the level at the output of the forward moving path 2 is less than the input level by the same amount.

A second marginal relay 30 has its winding connected to the output of the pilot detector 15. This relay should be adjusted so that the moving spring 31 makes contact with the upper fixed spring 32 when the pilot level is greater than the normal level by some suitable amount such as two decibels, and so that the moving spring 31 makes contact with a lower fixed spring 33 when the pilot level is below the normal value by the same amount. The critical level difference for the relay 30 should be less than that for the relay 26.

According to the invention, also, an arrangement for inserting attenuation is connected to the output of the amplifier 1. This arrangement comprises a transformer 34, the primary winding 35 of which is connected to the secondary winding 7 of the transformer 5 through an adjustable attenuation pad 36. The secondary winding 37 of the transformer 34 is connected to the outgoing circuit leading to the next amplifier (not shown). Another secondary winding 38 of the transformer 34 is connected to a circuit including a capacitor 39, a resistor 40, and a rectifier 41, all connected in series. A direct current bias source for the rectifier 41 consists of two batteries 42 and 43 connected in series, with the common point connected to the junction of the winding 38 and the resistor 40, and the terminal points connected to the fixed springs 44 and 45 of an ordinary relay 46. The moving spring 47 is connected to the rectifier 41 in such manner that the battery 42 is connected across the resistor 40 and the rectifier 41 in series when the relay 46 is not operated, so that the rectifier 41 is then blocked. It will be apparent that when the relay 46 is operated, the rectifier will be connected to the source 43 instead of the source 42 and it will then be unblocked, and the resistor 40 will then be effectively connected across the winding 38. This will load the transformer 34, and the resistor 40 can be so chosen that the attenuation effectively introduced is some suitable value. Preferably this value should be equal to the level difference (six decibels) between the windings 19 and 21 sufficient to cause the contacts of the relay 26 to be just closed.

The relay 46 is controlled jointly by the relays 26 and 30. The moving spring 27 of the relay 26 is connected to a grounded direct current source 48 and the upper fixed spring 28 is connected to one end of the winding of the relay 46. The moving spring 31 of the relay 30 is connected to ground, and the two fixed springs 32 and 33 are connected together and to the other end of the winding of the relay 46. It will be seen that if the gain of the amplifier 1 exceeds the specified amount (six decibels), and if at the same time the level of the pilot current is too high or too low by at least two decibels, for example, the circuit for operating the relay 46 will be completed, and the prescribed amount of attenuation will be inserted after the amplifier 1. Thus it will be seen that if, for example, the pilot wave should disappear, the gain of the amplifier 1 will be adjusted to the maximum value, but owing to the operation of both of the relays 26 and 30, the relay 46 will be operated and will insert sufficient attenuation in the path of the amplifier to prevent the overall gain from becoming excessive.

It will be noted that if the pilot current is normal, and if on account of normal changes in the communication circuit the gain of the amplifier 1 should increase to six decibels or more, the relay 46 will not be operated because the relay 30 will not close either of its contacts since the pilot level at the output of the amplifier 1 will be normal.

If any of the elements 12, 14 or 15 should cease to function, the effect will generally be similar to loss of the pilot wave. This will cause the gain of the amplifier 1 to be increased to the maximum and relays 26, 30 and 46 will operate, as before, and the necessary attenuation will be inserted in the circuit.

If the control oscillator 16 should fail, the effect will be to increase the gain of the amplifier 1 to the maximum, thus operating relay 26. Relay 46 will in this case be operated, because the pilot level will become abnormally high and will cause the relay 30 to be operated. Thus, attenuation will be inserted, as desired.

It will be noted that since the lower spring 29 of the relay 26 is not used in this circuit, no effect is produced if the gain of the amplifier 1 should become abnormally small. In this case, of course, there is no danger of the transmission equivalent of the circuit becoming excessively low, and accordingly it is not desired that any attenuation should be inserted.

It will be evident to those skilled in the art that a system of alarm relays (not shown) may be connected to the springs of the relays 26 and 30 to give any desired series of alarms indicating the type of fault or abnormality which may be present. Since this aspect of the circuit is not concerned with the invention, no details are given.

The adjustable pad 36 is not essential and is provided as a convenience in order that when setting up the circuit a suitable amount of attenuation may be included. It is intended that the pad 36 shall be adjusted by hand.

It will be noted that when the relay 46 operates, the attenuation will be introduced rather suddenly into the circuit and this may produce undesirable oscillations in the signal level at various points of the circuit due to the sudden changes in adjustment of the other amplifiers (not shown). It may, therefore, be desirable that the attenuation should be introduced relatively slowly, and this may be done for example by replacing part or the whole of the resistor 40 by a directly heated thermistor. It will be seen that when the relay 46 operates to unblock the rectifier 41, the thermistor, being cold, will first present a very high resistance, but after a short period it will become heated and its resistance will become reduced relatively slowly to the final value which will be that which will produce the desired attenuation. By this means the sudden change in level produced by inserting the attenuation will be avoided. Various other methods of introducing the attenuation relatively slowly will occur to those skilled in the art.

The pilot frequency is usually chosen to lie within the signal frequency band, and a preferred value for this frequency is at the centre of the band. The pilot frequency must, of course, be outside any individual channel frequency band and should not coincide with any of the carrier frequencies. It is therefore chosen to differ from one of the carrier frequencies by a small amount sufficient to enable it to be selected by the pilot filter 12 without too much difficulty. For example, a usual frequency band for a group of channels extends from 60 to 108 kilocycles per second, and a convenient value for the pilot frequency is 84.08 kilocycles per second which differs slightly from the carrier frequency 84 kilocycles per second. The test frequency supplied by the oscillator 17 should lie outside the band 60 to 108 kilocycles per second, but otherwise the value chosen is not important.

While the principles of the invention have been described above in connection with specific embodiments, and particular modifications thereof, it is to be clearly understood that this description is made only by way of example and not as a limitation on the scope of the invention.

What I claim is:

1. A safe-guarding arrangement for an electric wave amplifier provided with a pilot-operated automatic gain control arrangement and adapted to amplify electric waves occupying a specified band of frequencies comprising: monitoring means, separate from said gain control arrangement, for continuously measuring the gain of said amplifier and comprising; a source of test waves having a frequency lying outside said specified band of frequencies, means connecting said source of test waves to the input of said amplifier and detector means for effectively comparing the level of said test waves at the input and output of said amplifier; switch means controlled by said monitoring means when the measured gain exceeds a specified value; a marginal relay responsive to said detector means, said relay having a pair of contacts controlling said switch means and adjusted in such manner that said contacts are closed when the output level exceeds the input level by the specified value; attenuation means providing a predetermined amount of attenuation; and means controlled by said switch means for automatically inserting said attenuation means in cascade with said amplifier.

2. An arrangement according to claim 1 comprising a second marginal relay responsive to said pilot current and having two pairs of contacts, said second marginal relay being so adjusted that it closes one pair of contacts when the pilot level is greater than its normal value by a second specified value less than the first named specified value and that it closes another pair of contacts when the pilot level is less than the normal level by the said second specified value and in which said switch means comprises a third relay the energizing circuit of which includes contacts on said first named and said second marginal relays.

3. An arrangement according to claim 2 in which said attenuation means comprises a transformer having a primary winding and two secondary windings, the primary winding being connected to the output of said amplifier, a first secondary winding being connected to the outgoing line circuit, and a second secondary winding having connected across it a resistor in series with a normally blocked rectifier, and said third relay being provided with contacts so connected as to unblock said rectifier when said third relay is operated.

References Cited in the file of this patent

UNITED STATES PATENTS

| | | |
|---|---|---|
| 1,811,954 | Mitchell et al. | June 30, 1931 |
| 1,859,498 | Carpe | May 24, 1932 |
| 2,379,069 | Dysart | June 26, 1945 |
| 2,396,990 | Dysart | Mar. 19, 1946 |
| 2,752,571 | Terroni | June 26, 1956 |